United States Patent
Masui et al.

(10) Patent No.: US 6,764,707 B1
(45) Date of Patent: Jul. 20, 2004

(54) WATER-IN-OIL TYPE EMULSIFIED FAT AND/OR OIL COMPOSITION

(75) Inventors: Kenji Masui, Tokyo (JP); Yoshihiro Konishi, Wakayama (JP)

(73) Assignee: Kao Corporation, Tokyo (JP)

(*) Notice: Subject to any disclaimer, the term of this patent is extended or adjusted under 35 U.S.C. 154(b) by 253 days.

(21) Appl. No.: 10/019,427

(22) PCT Filed: Jun. 30, 2000

(86) PCT No.: PCT/JP00/04359
§ 371 (c)(1), (2), (4) Date: Dec. 31, 2001

(87) PCT Pub. No.: WO01/01787
PCT Pub. Date: Jan. 11, 2001

(30) Foreign Application Priority Data

Jun. 30, 1999 (JP) .......................................... 11-184762

(51) Int. Cl.$^7$ ................................................. A23D 7/04
(52) U.S. Cl. ..................................... 426/601; 426/602
(58) Field of Search .................................. 426/601, 602

(56) References Cited

U.S. PATENT DOCUMENTS

| | | | |
|---|---|---|---|
| 4,284,655 A | | 8/1981 | Miller et al. |
| 4,656,045 A | | 4/1987 | Bodor et al. |
| 4,882,187 A | * | 11/1989 | Izzo et al. ................... 426/335 |
| 4,959,160 A | * | 9/1990 | Lake ......................... 516/162 |
| 5,879,735 A | | 3/1999 | Cain et al. |
| 6,004,611 A | | 12/1999 | Gotoh et al. |
| 6,022,579 A | | 2/2000 | Mori et al. |
| 6,153,248 A | * | 11/2000 | Tajiri et al. .................. 426/604 |
| 6,190,721 B1 | * | 2/2001 | Kimura et al. ............... 426/604 |
| 6,448,292 B2 | | 9/2002 | Koike et al. |
| 6,495,536 B1 | | 12/2002 | Masui et al. |
| 6,497,914 B1 | * | 12/2002 | Hidaka et al. ............... 426/570 |

FOREIGN PATENT DOCUMENTS

| | | |
|---|---|---|
| EP | 0 417 562 | 3/1991 |
| GB | 1 564 801 | 4/1980 |
| JP | 61-63242 | 4/1986 |
| JP | 3-91441 | 4/1991 |
| JP | 7-121196 | 12/1995 |
| JP | 10-176181 | 6/1998 |
| WO | WO 95/22257 | 8/1995 |
| WO | WO 96/32022 | 10/1996 |

OTHER PUBLICATIONS

Derwent Abstract, EP 307 154, Mar. 15, 1989.
U.S. patent application Ser. No. 10/019,427, Masui et al., filed Dec. 31, 2001.
U.S. patent application Ser. No. 10/009,494, Masui et al., filed Apr. 8, 2002.
U.S. patent application Ser. No. 09/926,741, Kawai et al., filed Dec. 11, 2001.
U.S. patent application Ser. No. 10/032,493, Koike et al., filed Jan. 2, 2002.
U.S. patent application Ser. No. 10/061,286, Koike et al., filed Feb. 4, 2002.
U.S. patent application Ser. No. 09/900,053, Sugiura et al., filed Jul. 9, 2001.
U.S. patent application Ser. No. 10/343,742, Koike et al., filed Feb, 6, 2003.
U.S. patent application Ser. No. 09/907,811, Nakajima et al., filed Jul. 19, 2001.
U.S. patent application Ser. No. 09/985,755, Kudo et al., filed Nov. 6, 2001.
U.S. patent application Ser. No. 10/014,356, Kawai et al., filed Dec. 14, 2001.
U.S. patent application Ser. No. 10/101,606, Kataoka et al., filed Mar. 21, 2002.
U.S. patent application Ser. No. 10/101,607, Suzuki et al., Mar. 21, 2002.
U.S. patent application Ser. No. 10/132,504, Koike et al., Apr. 26, 2002.
U.S. patent application Ser. No. 10/120,514, Sakai et al., filed Apr. 12, 2002.
U.S. patent application Ser. No. 10/166,687, Komatsu et al., filed Jun. 12, 2002.
U.S. patent application Ser. No. 10/343,748, Koike et al., filed Feb. 6, 2003.
U.S. patent application Ser. No. 10/343,831, Koike et al., filed Feb. 10, 2003.
U.S. patent application Ser. No. 10/014,449, Sakai et al., filed Dec. 14, 2001.
U.S. patent application Ser. No. 10/083,387, Sakai et al., Feb. 27, 2002.
U.S. patent application Ser. No. 10/131,188, Hase et al., filed Apr. 25, 2002.
U.S. patent application Ser. No. 10/259,615, Sakai et al., filed Sep. 30, 2002.
U.S. patent application Ser. No. 10/244,736, Masui et al., filed Sep. 17, 2002.
U.S. patent application Ser. No. 10/238,720, Hase et al., filed Sep. 11, 2002.

* cited by examiner

Primary Examiner—Carolyn Paden
(74) Attorney, Agent, or Firm—Oblon, Spivak, McClelland, Maier & Neustadt, P.C.

(57) ABSTRACT

The present invention provides a water-in-oil type emulsified fat and/or oil composition which comprises a diglyceride and which is excellent in a flavor release during the time for ingestion thereof. That is, the present invention provides a water-in-oil type fat and/or composition which is composed of (1) the aqueous phase based on water and (2) the oil phase comprising 15% by weight or more based on the total oils and fats, of diglycerides, the composition including a flavor component(s), 30% by weight or more of the said emulsified composition being able to be reversed in phase within one minute after it has been introduced into water at 36° C.

6 Claims, No Drawings

WATER-IN-OIL TYPE EMULSIFIED FAT AND/OR OIL COMPOSITION

TECHNICAL FIELD

The present invention relates to a water-in-oil type emulsified fat and/or oil composition which comprises a diglyceride and which is excellent in a flavor release during the time for ingestion thereof. The water-in-oil type emulsified fat and/or oil composition of the present invention is preferably and suitably utilized in a margarine, a fat spread, a butter cream, a shortening, etc.

BACKGROUND ART

In recent years, the intake of lipid in eating habits in various developed countries is increasing to raise the concentration of triglycerides (neutral fat) in blood and to cause obesity, and this has been a major cause of Life style related disease.

Diglyceride has been revealed to be a fat or oil, after which is eaten, which hardly increases the concentration of a neutral fat in blood and hardly constitutes a body fat (JP-A 10-176181). Therefore, the diglyceride is, expected to be used as the substitution of a conventional fat or oil in a (water-in-oil emulsion) food having a large amount of the fat or oil such as a cooking oil, in particular, a margarine and a spread.

Various water-in-oil type emulsified compositions containing a diglyceride blended with a fat and/or oil are proposed, for example, in JP-B 7-121196, JP-A 3-91441, U.S. Pat. No. 4,284,655, JP-A 61-63242, U.S. Pat. No. 5,879,735, WO 95/22257, WO 96/32022 and the like, but there is no description of a flavor release from the flavor component thereof.

The present inventors have further continued in the investigation of the water-in-oil type emulsified fat and/or oil composition. As the result, they found the problem that the foods containing diglycerides in the high concentration during the time for ingestion and the foods are not good in flavor release related directly to the degree of good taste thereof. This phenomenon is not observed in a fat and/or oil being mainly based on a triglyceride.

DISCLOSURE OF THE INVENTION

The present inventors have found that in a system of the water-in-oil type emulsion containing diglycerides in the high concentration, emulsification is so stable that the rate of the phase reversal of the emulsion from W/O type to O/W type in the mouth delays, thus affecting much of the flavor release.

The present invention provides a water-in-oil type emulsified fat and/or oil composition which is composed of (1) the aqueous phase based on water and (2) the oil phase of fat and/or oil comprising 15% by weight or more, based on the total oils and fats, of diglycerides, and the composition including a flavor component(s), 30% by weight or more of the said emulsified composition being able to be reversed in phase within one minute after it has been introduced into water at 36° C. Thus, the above-mentioned problem of the prior art has been solved.

Further, the fat(s) and/or oil(s) of the present invention comprise preferably 15 to 90% by weight of diglycerides and 85 to 10% by weight of triglycerides. The composition of the present invention may comprise 0.05 to 20% by weight, preferably 0.1 to 10% by weight, of flavor components.

MODES FOR CARRYING OUT THE INVENTION

The fatty acid constituting the diglyceride used in the present invention includes a $C_6$ to $C_{22}$ saturated or unsaturated fatty acid, preferably a $C_{16}$ to $C_{22}$ unsaturated fatty acid. In the fatty acid group which is contained in the diglyceride, an unsaturated fatty acid is desirable in the amount of 55% by weight or more.

As the starting fat or oil used in the diglyceride, a fat or oil containing a large amount of an unsaturated fatty acid-residue, for example, including a vegetable (or plant) fat or oil such as safflower oil, olive oil, cottonseed oil, rapeseed oil, corn oil, soybean oil and palm oil; further, an animal fat or oil such as lard, beef-tallow and butter; and a fractional oil thereof, a transesterified oil thereof and a hydrogenated oil (hardened oil) thereof may be used. The diglyceride is obtained by ester-exchanging reaction (ester-interchanging reaction or transesterification) of a mixture of one or more of these fats and oils and glycerol in the presence of a catalyst or by the ester-exchanging reaction of a mixture of a fatty acid composition having the high levels of unsaturated fatty acids and glycerol in the presence of a catalyst.

An excess of monoglycerides formed in a mixture of the generated diglycerides can be removed by a molecular distillation method or a chromatography method. The remaining monoglycerides are desirably removed to make it as small as possible. When the content thereof is 5% by weight or less (preferably 2% by weight or less), there is no problem.

From the viewpoint of the stability in the emulsification, the content of diglycerides in the present invention is preferably 15% by weight or more, particularly preferably 15 to 90% by weight based on the amount of the fats and oils. The content is particularly preferably 45% by weight or more from the viewpoint of controlling triglycerides in blood and inhibiting the accumulation of body fat.

The flavor component referred to in the present invention means all additives, related to tastes and aromas, such as perfumes, tasting agents (proteinous materials, amino acids etc.), spices, salts and sugars, and these are blended in an aqueous phase and/or an oil phase.

The degree of the phase reversal referred to in the present invention can be confirmed by means of the concentration of the flavor component blended in the aqueous phase in water, when 5 g of the emulsified fat and/or oil composition was dispersed in 50 g of water with a magnetic stirrer (with a bar of 2.5 cm in length, revolved at 300 rpm) at a controlled temperature of 36° C. in a beaker having its capacity of 100 ml. For example, in case a salt is placed as a flavor component, the degree of the phase reversal is represented in terms of the concentration of the salt in water after the emulsified composition have been dispersed in water at an oral temperature (about 36° C.) for one minute, given that the recognized salt concentration in water is made to 100 when demulsification is carried completely out by heating. If a sugar is placed as a flavor component, the concentration of the sugar may be measured by the same way as those in mentioned above. It is desired that 30% or more, preferably 50% or more and particularly preferably 80% or more of the emulsion is made to reverse in phase for an initial one minute. When the degree of the phase reversal is less than 30%, the strength of the flavor release is considerably low and the start of the release delays.

The composition exhibiting such a physical property can also be prepared even by selecting an ordinarily used formulation ingredient and an amount thereof. However, the demulsifier shown below (which is not ordinarily used in a W/O type emulsion) is advantageously used in order to easily obtain such a composition.

The demulsifier referred to in the present invention is an additive functioning as a flavor enhancer or a flavor release-enhancer, which makes the phase reverse rapidly in the mouth during the time for ingestion, without affecting the stability in the emulsification during storage, to realize the excellent flavor release.

As the demulsifier, a polyglycerol fatty acid ester, a water-soluble decomposed protein, lysolecithin, a sucrose fatty acid ester, a monoglyceride organic acid ester and a sorbitan fatty acid ester described below may be used.

The polyglycerol fatty acid ester should be a mono-, di- or poly-ester of a saturated or unsaturated fatty acid having 10 to 22 carbon atoms, wherein the fatty acid constitutes the polyglycerol fatty acid ester, and polyglycerol and it should have HLB of 7 or more (preferably 11 or more). If the HLB is less than 7, the flavor release is worsened on the contrary.

As the decomposed protein, one or more kinds obtained by decomposing a milk protein, a vegetable (or plant) protein, an egg protein or the like with an enzyme or acid may be used. Specifically, the milk protein for use includes casein, lactalbumin, lactoglobulin, lactoferrin, whey (or milk serum), skim milk powder (or non-fat milk powder), whole milk powder, butter milk powder, milk serum protein, milk etc. The plant protein includes soybean protein, wheat protein, corn protein etc. The egg protein includes ovalbumin, conalbumin, ovomucoid, ovoglobulin, egg white protein, yolk protein, whole egg protein etc.

As a preferable physical property of the decomposed protein obtained by decomposing one of these, water solubility is mentioned. If they are water-insoluble, the flavor release is worsened on the contrary due to gelation of the protein. Further, the decomposing treatment is carried preferably out before blending but it may be carried out during or after emulsification.

The lysolecithin is a water-soluble compound constituted from a fatty acid being a $C_{10}$ to $C_{22}$ saturated or unsaturated fatty acid and it has HLB of 8 or more (preferably 12 or more). If the HLB is less than 8, the flavor release is worsened on the contrary.

The sucrose fatty acid ester should be a mono-, di-, or poly-ester of a saturated or unsaturated fatty acid having 10 to 22 carbon atoms, wherein the fatty acid constitutes the sucrose fatty acid ester, and sucrose; and it should have HLB of 5 or more (preferably 8 or more). If the HLB is less than 5, the flavor release is worsened on the contrary.

The monoglyceride organic acid ester is one having 1 or 2 organic acids bonded to a monoglyceride constituted of a saturated or unsaturated fatty acid having 10 to 22 carbon atoms and it should have HLB of 8 or more. If the HLB is less than 8, the flavor release is worsened on the contrary.

The sorbitan fatty acid ester should be constituted from a saturated or unsaturated fatty acid having 10 to 22 carbon atoms, and it should have HLB of 8 or more. In particular, one of polysorbates known as Tween series from Atlas Ltd. in United States of America, including polyoxyethylene sorbitan monostearate (Tween 60), polyoxyethylene sorbitan tristearate (Tween 65), polyoxyethylene sorbitan monooleate (Tween 80), polyoxyethylene sorbitan monolaurate (Tween 20) and polyoxyethylene sorbitan monopalmitate (Tween 40) can be preferably used. Incidentally, if the HLB is less than 8, the flavor release is worsened on the contrary.

The value determined by the formula of Griffin was used as HLB of the polyglycerol fatty acid, monoglyceride organic acid ester or sorbitan fatty acid ester, while the value measured by the emulsification method was used as HLB of lysolecithin or the sucrose fatty acid ester.

It is important that the demulsifier is added in such an amount as to exhibit the action of demulsification (effect of improving the flavor release). Although the demulsifier is preferably added to the aqueous phase, there is no problem if it is added to the oil phase. Its approximate amount is within the range of 0.01 to 5% by weight, preferably 0.1 to 1% by weight, in the composition.

The starting material of an edible fat or oil used in the present invention may be one or more selected from vegetable fats and oils including soybean oil, rapeseed oil, palm oil, corn oil, cottonseed oil, coconut oil and palm kernel oil; and animal fats and oils including lard, fish oil and milk fat; and those obtained by hydrogenation or ester-exchange of these oils, for use.

The solid fat content (SFC) in the oil phase used in the present invention may be usually within the range of 1 to 35 at 5 to 35° C., preferably 7 to 30 at 20° C. and preferably 1 to 20 at 30° C.

The water-in-oil type emulsified fat and/or oil composition of the present invention may be prepared in a usual manner, and the ratio of the aqueous phase based on water to the oil phase by weight can be made within the range of the oil phase: the aqueous phase=20:80 to 85:15 (preferably 40:60 to 85:15).

A dairy product, an emulsifier or the like as a subcomponent in the oil phase may be blended with the composition of the present invention. Further, milk protein, starch, a thickening polysaccharide, a thermoplastic protein (gelatin etc.) or the like may be blended with the aqueous phase based on water.

Further, an anti-oxidant including tocopherol, an ascorbyl ester such as palmitate and stearate, a tea leaf, a herb such as rosemary, a natural anti-oxidizing component extracted from a leaf or a root of a peach may be used together in order to inhibit the deterioration of the water-in-oil type emulsified fat and/or oil composition.

EXAMPLES

Preparation of the Diglyceride

While the fatty acid obtained from a soybean oil (obtained by wintering at 0° C.) and glycerol were mixed at the molar ratio of 2:1, they were reacted at 70° C. for 3 hours in the presence of a catalyst as a commercial lipase preparation of immobilized 1,3-position-selective lipase (Lipozyme 3A™ provided by Novo Industry A.S.). During the reaction, the inside pressure of the system was reduced to 0.26 kPa in order to remove water formed by esterification. After the lipase preparation was removed by filtration from the reaction product, the filtrate was subjected to molecular distillation, decoloration and deodorization to obtain the diglyceride (consisting of diglyceride content of 85% by weight, monoglyceride content of 1.3% by weight and triglyceride content of 13.7% by weight and having open tube melting point of 5° C.).

Examples 1 to 5 and Comparative Examples 1 to 4

According to the recipe of Table 1, the compositions were emulsified at 70° C. for 10 minutes by a homogenizing mixer (Tokushu Kika Kogyo Co., Ltd.) to make the plastic emulsion 800 g after the reaction. The obtained emulsion was rapidly cooled and plasticized in a usual manner whereby a water-in-oil type emulsified fat and/or oil composition was produced.

The degree of phase reversal of the obtained water-in-oil type emulsified fat and/or oil composition was measured in the following manner.

Namely, after 50 g of water was placed in a beaker having its capacity of 100 ml and was adjusted to 36° C., 5 g of the emulsified fat and/or oil composition was dispersed therein with a magnetic stirrer (with a bar of 2.5 cm in length, revolved at 300 rpm). The salt concentration in the water was measured with time. The degree of phase reversal was made as (salt concentration in water after one minute)÷(salt concentration upon complete demulsification)×100. Then, a compact meter C-121 (Horiba, Ltd.) for a salt content was used for the measurement of the salt concentration. The results are shown in Table 1.

Then, the obtained water-in-oil type emulsified fat and/or oil compositions (the product just after preparation and the product after storage at 5° C. for 30 days) were evaluated in viewpoint of their flavor release upon eating in mouth under the following criteria by special panelists (10 panelists). The average points are also shown in Table 1.

The evaluation criteria are as follows.

4: The flavor release is very good.

3: The degree of the flavor release is slightly weak and the start of the release delays slightly.

2: The degree of the flavor release is extremely weak and the start of the release delays.

1: The degree of the flavor release is extremely bad and the start of the release delays extremely.

C: Polyglycerol fatty acid ester having HLB of 15 (ML-750, provided by Sakamoto Yakuhin Kogyo Co.; Ltd.)
D: Polyglycerol fatty acid ester having HLB of 11 (SO-750, provided by Sakamoto Yakuhin Co., Ltd.)
E: Whey protein (provided by Morinaga Milk Industry Co., Ltd.)
F: Sucrose fatty acid ester having HLB of 1 (F-10, provided by Dai-ichi Kogyo Seiyaku Co., Ltd.)
G: Polyglycerol fatty acid ester having HLB of 4.5 (Sunsoft Q-175S, provided by Taiyo Kagaku Co., Ltd.)

What is claimed is:

1. A process of preparing a water-in-oil emulsion comprising adding a demulsifier to a component of an emulsion composition, said demulsifier acting to reverse at least 30% of a water-in-oil phase of said emulsion composition within one minute after said emulsion composition has been introduced into water at 36° C.,
   wherein said emulsion composition comprises an aqueous phase comprising water and an oil phase;
   comprising at least 15% by weight based on a total weight of said oil phase, of diglyceride; and at least one flavor component and 0.01 to 5 wt. % of said demulsifier
   wherein said demulsifier is at least one member selected from the group consisting of a polyglycerol fatty acid ester having HLB of 7 or more, a water soluble decomposed protein, a sucrose fatty acid ester having an HLB of 5 or more, a monoglyceride organic ester having an HLB of 8 or more and a sorbitan fatty acid ester having an HLB of 8 or more.

2. The process as claimed in claim 1, wherein said oil phase comprises 15–90% by weight of at least one diglyceride and 85–10% by weight of at least one triglyceride, and said composition comprises 0.05–20% by weight of the flavor component and from 0.01–5% by weight of the demulsifier.

3. The process as claimed in claim 1, wherein a weight ratio of the aqueous phase to the oil phase ranges between 80:20 and 15:85.

4. A water-in-oil emulsion composition comprising an aqueous phase comprising water and an oil phase compris-

TABLE 1

|  |  | Examples |  |  |  |  | Comparative Examples |  |  |  |
|---|---|---|---|---|---|---|---|---|---|---|
|  |  | 1 | 2 | 3 | 4 | 5 | 1 | 2 | 3 | 4 |
| Oil phase (parts) | Diglyceride | 48.9 | 48.9 | 48.9 | 48.9 | 55.5 | 48.9 | 18.6 | 48.6 | 48.9 |
|  | Partially hydrogenated (hardened) palm oil (IV = 40) | 21.0 | 21.0 | 21.0 | 21.0 | 13.9 | 21.0 | 20.8 | 20.8 | 21.0 |
|  | Stearic acid monoglyceride | — | — | — | — | 0.5 | — | — | — | — |
|  | Additive 1 type | — | — | — | — | — | — | F 0.5 | G 0.5 | — |
|  | Vitamin E | 0.02 | 0.02 | 0.02 | 0.02 | 0.02 | 0.02 | 0.02 | 0.02 | 0.02 |
|  | β-Carotene | 0.002 | 0.002 | 0.002 | 0.002 | 0.002 | 0.002 | 0.002 | 0.002 | 0.002 |
|  | Butter flavor | 0.1 | 0.1 | 0.1 | 0.1 | 0.08 | 0.1 | 0.1 | 0.1 | 0.1 |
|  | Cheese flavor | — | — | — | — | 0.02 | — | — | — | — |
|  | Distilled water | 27.9 | 27.9 | 27.9 | 27.9 | 24.9 | 27.9 | 28.4 | 28.4 | 28.4 |
| Aqueous phase (parts) | Additive 2 type | A 0.5 | B 0.5 | C 0.5 | D 0.5 | C 0.5 | E 0.5 | — | — | — |
|  | Skim milk powder | 0.3 | 0.3 | 0.3 | 0.3 | 0.3 | 0.3 | 0.3 | 0.3 | 0.3 |
|  | Common salt | 1.3 | 1.3 | 1.3 | 1.3 | 1.3 | 1.3 | 1.3 | 1.3 | 1.3 |
|  | Fresh cream | — | — | — | — | 3 | — | — | — | — |
| Degree of phase reversal (%) |  | 100 | 100 | 100 | 66 | 100 | 17 | 17 | 8 | 25 |
| Flavor release (just after production) |  | 4 | 4 | 3.9 | 3.5 | 4 | 1.2 | 1 | 1 | 2 |
| Flavor release (after storage) |  | 4 | 4 | 3.9 | 3.5 | 4 | 1 | 1 | 1 | 2 |

SFC in the oil phase in Examples 1 to 4 and Comparative Examples 1 to 4 was 15.3 at 20° C. or 8.8 at 30° C.; and SFC in the oil phase in Example 5 was 9.8 at 20° C. or 6.0 at 30° C.

A: Decomposed whey protein (provided by Morinaga Milk Industry Co., Ltd.)
B: Sucrose fatty acid ester having HLB of 15 (F-160, provided by Dai-Ichi Kogyo Seiyaku Co., Ltd.)

ing 15–90% by weight of at least one diglyceride and 85–10% by weight of at least one triglyceride, and said composition comprises 0.01–5% by weight of a demulsifier and 0.05–20% by weight of at least one flavor component, wherein at least 30% of said composition is capable of reversing in phase within one minute after being introduced into water at 36° C. and wherein said demulsifier is at least one member selected from the group consisting of a polyglycerol fatty acid ester having HLB of 7 or more, a water soluble decomposed protein, a sucrose fatty acid ester having an HLB of 5 or more, a monoglyceride organic ester having an HLB of 8 or more and a sorbitan fatty acid ester having an HLB of 8 or more.

5. The composition as claimed in claim 4, wherein a weight ratio of the aqueous phase to the oil phase ranges between 80:20 and 15:85.

6. A water-in-oil emulsion composition comprising an aqueous phase comprising water and an oil phase comprising at least 15% by weight of at least one diglyceride wherein said weight percent is based on a total weight of said oil phase;

a demulsifier; and at least one flavor component, wherein at least 30% by weight of said composition is capable of reversing in phase within one minute after being introduced into water at 36° C.; and wherein said demulsifier is at least one member selected from the group consisting of a polyglycerol fatty acid ester having HLB of 7 or more, a water soluble decomposed protein, a sucrose fatty acid ester having an HLB of 5 or more, a monoglyceride organic ester having an HLB of 8 or more and a sorbitan fatty acid ester having an HLB of 8 or more.

* * * * *